(12) United States Patent
Rusch et al.

(10) Patent No.: US 9,233,745 B2
(45) Date of Patent: Jan. 12, 2016

(54) SEAL APPARATUS FOR A SHIP PROPELLER SHAFT AND METHOD OF MAKING THE APPARATUS

(71) Applicant: SKF Blohm + Voss Industries GmbH, Hamburg (DE)

(72) Inventors: Mathias Rusch, Winsen/Luhe (DE); Joerg Brand, Trittau (DE); Marko Wrage, Struvenhuetten (DE); Nils Boettcher, Daldorf (DE)

(73) Assignee: SKF Blohm + Voss Industries GmbH, Hamburg (DE)

( * ) Notice: Subject to any disclaimer, the term of this patent is extended or adjusted under 35 U.S.C. 154(b) by 0 days.

(21) Appl. No.: 14/284,517

(22) Filed: May 22, 2014

(65) Prior Publication Data
US 2014/0346738 A1 Nov. 27, 2014

(30) Foreign Application Priority Data

May 22, 2013 (DE) .......................... 10 2013 008 967

(51) Int. Cl.
*F16J 15/16* (2006.01)
*B63H 23/32* (2006.01)
*F16J 15/00* (2006.01)

(52) U.S. Cl.
CPC ............ *B63H 23/321* (2013.01); *F16J 15/004* (2013.01); *B63H 2023/327* (2013.01); *Y10T 29/49716* (2015.01)

(58) Field of Classification Search
CPC ............................... F16J 15/324; F16J 15/164
See application file for complete search history.

(56) References Cited

U.S. PATENT DOCUMENTS

| 4,984,811 | A  | * | 1/1991  | Kuwabara et al. ............ 277/563 |
| 5,374,208 | A  | * | 12/1994 | von Bergen et al. ............ 440/80 |
| 5,643,026 | A  |   | 7/1997  | Pietsch et al. |
| 7,025,126 | B1 |   | 4/2006  | Wyatt et al. |
| 2007/0241560 | A1 | | 10/2007 | Malone |
| 2014/0048461 | A1 | | 2/2014  | Wrage et al. |

FOREIGN PATENT DOCUMENTS

| DE | 44 34 247  | 3/1996 |
| EP | 1 182 133  | 2/2002 |
| GB | 2 213 539  | 8/1989 |

OTHER PUBLICATIONS

European Search Report for European Patent Application No. 14 00 1176, dated Sep. 18, 2014, 2 pages, with English translation, 2 pages.

* cited by examiner

Primary Examiner — Gilbert Lee
(74) Attorney, Agent, or Firm — W. F. Fasse

(57) ABSTRACT

A seal apparatus, for sealing around a rotating shaft such as a propeller shaft of a watercraft between the exterior water and an interior lubricant space, includes a multiple seal arrangement with plural seal rings forming seal chambers therebetween, and plural fluid medium lines supplying and/or returning a respective fluid medium to a respective seal chamber. A section of a first medium line is formed as an axial passage through a housing of the apparatus, and a section of a second medium line is formed by a pipe arranged within the axial passage in the housing. A method of making such an apparatus especially by retrofitting an existing seal arrangement involves inserting a pipe into an axial passage in the housing in order to establish two medium lines through the housing where there was previously only one medium line.

20 Claims, 2 Drawing Sheets

SEAL APPARATUS FOR A SHIP PROPELLER SHAFT AND METHOD OF MAKING THE APPARATUS

PRIORITY CLAIM

This application is based on and claims the priority under 35 USC 119 of German Patent Application DE 10 2013 008 967.0, filed on May 22, 2013, the entire disclosure of which is incorporated herein by reference.

FIELD OF THE INVENTION

The invention relates to a seal apparatus for sealing a rotating shaft such as a propeller shaft of a watercraft between an exterior water side and an interior side in a lubricant space. The invention further relates to a method of making such a seal apparatus.

BACKGROUND INFORMATION

Various types and configurations of seal arrangements, bushings, packing boxes, stuffing boxes, glands and the like are known for providing a seal around the rotating shaft that drives a ship's propeller, for example where the shaft penetrates through the stern of the ship from the interior to the exterior of the ship's hull. The seal arrangement must effectively prevent water from the exterior environment, i.e. from the exterior of the hull below the water line, leaking into the interior of the hull where the shaft penetrates through the hull, while still allowing the shaft to rotate. Preferably, the seal arrangement should also dissipate the frictional heat that arises due to rubbing friction of seal elements on the rotating shaft, should allow for the removal of wear particles or other contaminants from the seal arrangement, and further should provide a long operating life and allow easy maintenance.

One known type of seal arrangement uses plural seal rings spaced axially from one another along the propeller shaft in a stern tube, for example, thereby forming successive seal chambers respectively between successive neighboring ones of the seal rings. An outermost chamber can be filled with seawater, an intermediate chamber can be pressurized with a compressed gas such as compressed air, and an inner chamber can be filled with oil. The respective fluid, for example air or oil, can be supplied to and drained from the respective seal chamber through respective medium lines.

A seal arrangement for sealing a ship propeller shaft between the exterior water and the interior lubricant space, of the above described general type is known, for example, from the German patent laying-open document DE 44 34 247. The disclosed arrangement comprises a multiple seal arrangement having two seal rings oriented toward the exterior water and two seal rings oriented toward the lubricant space of the ship propeller shaft. A respective seal chamber is formed respectively between neighboring seal rings. A fluid medium can be supplied into the respective seal chamber via a respective medium supply line, and the fluid can be removed from the chamber via another respective medium return line.

As seen in the direction from the interior lubricant space toward the exterior water, this known seal arrangement has the forwardmost or first seal chamber filled with an oil, the second or middle seal chamber filled with air, and the third or aft seal chamber filled with exterior water. Because the multiple seal arrangement is arranged outside of the ship hull, the respective medium lines conveying the respective medium to and from each chamber must, at least partially sectionwise, pass through a massive housing such as a stern tube section for example, or such as a gondola or pod housing, depending on the particular type of embodiment of the ship drive arrangement. These sections of the fluid supply and return lines guided through the housing are typically individual bored holes, that each respectively correspond to a single fluid supply or return line, and that each require a technically demanding and time intensive boring operation for their formation. This is especially problematic and disadvantageous when a seal arrangement of an existing ship propeller shaft is to be upgraded, retrofitted or supplemented with additional seal chambers and/or additional medium supply and return lines. In such a situation, it becomes necessary to bore additional individual bore holes through the massive housing around the ship propeller shaft, for which the required boring or drilling operations can lead to a long out-of-service time of the ship in a service dock. Such long out-of-service times must absolutely be avoided due to the high costs and accruing losses when the ship is out of service.

SUMMARY OF THE INVENTION

In view of the above it is an object of an embodiment of the invention to provide a seal apparatus for sealing around a rotating shaft, such as a propeller shaft, of a watercraft between the exterior water and an interior lubricant space, which provides a simplified, robust and effective supply and/or return of a fluid to one or more seal chambers of the seal apparatus, while avoiding or minimizing the disadvantages of the prior art as set forth herein. For example, an embodiment of the inventive apparatus aims to minimize or reduce the number of bored holes or passages that must penetrate through the ship's hull or housing of the shaft and/or the seal arrangement, to achieve a more compact arrangement, and to achieve a more-rapid and more-economical fabrication of the fluid supply and return arrangement for the seal apparatus. Another object of an embodiment of the invention is to simplify the operations necessary for retrofitting a multiple seal apparatus having actively circulated seal fluids, into an existing watercraft that had a seal apparatus with fewer seal chambers or no actively circulated seal fluids. A further object of an embodiment of the invention is to provide a method for producing or fabricating such a seal apparatus. The invention further aims to avoid or overcome the disadvantages of the prior art, and to achieve additional advantages, as apparent from the present specification. The attainment of these objects is, however, not a required limitation of the claimed invention.

The above objects have been achieved in embodiments of the invention relating to an apparatus and relating to a method, as set forth herein. An embodiment of the invention provides a seal apparatus for sealing around a rotating shaft of a watercraft where the shaft penetrates from an interior side to an exterior side of a hull of the watercraft. This apparatus embodiment comprises plural seal rings around the shaft, and plural medium lines. The seal rings form at least one seal chamber axially between successive ones of the seal rings. The medium lines communicate with at least one seal chamber, and include at least one medium supply line to supply a respective fluid medium to the at least one seal chamber and at least one medium return line to remove the respective fluid medium from the at least one seal chamber. A first portion of a first one of the medium lines is arranged and extends longitudinally within a first portion of a second one of the medium lines.

A further particular embodiment of an apparatus according to the invention for sealing a ship propeller shaft between the exterior water and an interior lubricant space has a multiple seal arrangement that includes at least one seal ring oriented toward the exterior water and at least one seal ring oriented toward the lubricant space. A seal chamber is formed between two neighboring seal rings, and a fluid can be supplied into the chamber via at least respectively one medium supply line, and the fluid can be removed or returned from the chamber via respectively at least one medium return line. According to this embodiment of the invention, at least two medium lines are guided or arranged at least partially or section-wise one within another. For example, one medium line includes a line portion embodied as a bored hole or passage, and the other medium line includes a line portion embodied as a pipe, tube, hose or the like that extends along within the bored hole or passage of the other medium line. The pipe is generally rigid to maintain its form along its length, but need not be rigid unless expressly stated as such.

Especially in seal apparatuses having a massive housing in which the bored hole or passage is provided, the partial or section-wise arrangement of a portion of one fluid medium line within a portion of another fluid medium line achieves the advantage that retrofitting or supplementing a seal arrangement with an additional medium line (for example to serve an additional seal chamber) will not require a time intensive and technically demanding operation to drill an additional bored hole or passage in the housing. Instead, inserting a pipe section into an existing housing passage is technically much simpler, quicker and more economical in comparison to the formation of an additional bored hole or passage. If necessary to ensure the provision of an adequate flow cross-section to maintain a required throughflow quantity or rate of the fluid in both the inserted pipe section and the remaining annular cross-section of the bored hole, then the existing bored hole must simply be enlarged by being further bored or reamed out before inserting the pipe section.

In one preferred embodiment, the pipe section is centrally arranged in the bored hole. This provides a coaxial arrangement whereby a ring-shaped and especially an axis-symmetrical remaining annular flow cross-section of the bored hole is formed around the pipe section. This produces a uniformalized fluid flow through the remaining annular cross-section of the bored hole, which is advantageous because it helps to prevent turbulence of the fluid flowing through the bored hole. The fluid flow in the bored hole can be further uniformalized, i.e. made more smooth, uniform and/or laminar, if the pipe section is sufficiently rigid to be self-supporting and is arranged without pipe supports, e.g. in the form of spiders, in the bored hole.

It is advantageous to avoid such pipe supports within the bored hole, because such pipe supports otherwise can cause turbulences in the fluid flow. To achieve this, the pipe section preferably extends entirely through and beyond the bored hole and is supported only at the ends of the pipe section outside of the bored hole.

In one embodiment of the invention, both the first medium line comprising the bored hole as a portion or section thereof, as well as the second medium line comprising the pipe section as a portion or section thereof, are both embodied as a gas line conveying a gas as the fluid medium, or as a liquid line conveying a liquid as the fluid medium. In an alternative embodiment, the first medium line comprising the bored hole is a gas line, while the second medium line comprising the pipe section is a liquid line. In a further alternative embodiment, the first medium line comprising the bored hole is a liquid line, and the second medium line comprising the pipe section is a gas line.

Another embodiment of the invention involves plural pipe sections as portions of plural medium lines guided through a single bored hole. This embodiment is especially advantageous for retrofitting or supplementing an existing seal apparatus with several additional medium lines. In this manner, the technical demands and expenditure of time for forming or establishing the additional medium lines is kept relatively low. Instead of needing to bore a new additional bored hole, it may merely be necessary to enlarge, e.g. bore out or ream out, the diameter of an existing bored hole that passes through the seal apparatus housing, in order to be able to arrange plural pipe sections therein while still maintaining the required fluid throughflow quantities.

In a particular embodiment having plural pipe sections within a single bored hole, the plural pipe sections are arranged centrally one within another and centrally within the bored hole. In other words, the pipe sections are thus arranged coaxially relative to one another and within the bored hole. This provides a cylindrical flow in the central pipe section, and annular or ring-shaped flows in the outer pipe section(s) and the bored hole. Such flow cross-sections can prevent or greatly reduce turbulence and thus flow losses in the respective fluid flows. In an alternative embodiment having plural pipe sections within a single bored hole, the pipe sections are arranged laterally next to one another or bundled coaxially about the center of the bored hole. In such an arrangement, the installation effort and technical complexity of the mounting of the plural pipe sections is reduced relative to the above-mentioned coaxial arrangement.

Further embodiments of the invention relate to a method of making or fabricating a seal apparatus as set forth herein. In an embodiment of the method involving retrofitting or supplementing an existing seal apparatus having a bored hole or passage through a housing of the seal apparatus, the method involves inserting at least one pipe section of a second medium line of the seal apparatus into the existing bored hole of a first medium line of the apparatus. Thereby, a multiple seal arrangement can be retrofitted or supplemented with at least one additional medium line in a technically simple and quick manner. In order to ensure that an adequate flow cross-section and thus an adequate flow quantity is maintained after inserting the pipe section into the bored hole, the bored hole can be enlarged by boring or reaming it out to a larger diameter before inserting the pipe section. Such enlargement of an existing bored hole is much simpler and quicker than boring a new additional hole.

For a new installation of a seal apparatus according to the invention, i.e. not a retrofit or upgrade situation in which there is already an existing bored hole, an embodiment of a method according to the invention involves boring a hole in a housing of the seal apparatus as a portion of one fluid medium line, and inserting a pipe section into the bored hole as a portion of another fluid medium line. Even though a new hole must be bored, the total number of holes to be bored is reduced to one half or less if at least one pipe section is arranged in each bored hole.

BRIEF DESCRIPTION OF THE DRAWINGS

In order that the invention may be clearly understood, it will now be explained in further detail in connection with example embodiments thereof, with reference to the accompanying drawings, wherein.

DETAILED DESCRIPTION OF PREFERRED EXAMPLE EMBODIMENTS AND THE BEST MODE OF THE INVENTION

A seal apparatus 1 according to the invention is for providing a seal around a rotating shaft 4 of a watercraft, where the shaft passes outwardly through a hull 16 of the watercraft from a hull interior side to a hull exterior side below the water line outside the hull of the watercraft. The "watercraft" can be any ship, boat, submarine, etc. that has a hull operating under, in and/or on the water. The rotating shaft may for example be a propeller shaft that drives a main propulsion propeller of the watercraft, or may drive an impeller of a water jet propulsion system, or may drive a propeller or impeller mounted on a gondola or pod housing of a pod drive system, or for a transverse thruster or any other thruster device such as an active rudder thruster. As further alternatives, a seal apparatus 1 according to the invention can be provided for any other type of rotating shaft penetrating out through the hull, not limited to a shaft driving a propeller or impeller.

Figure 1:
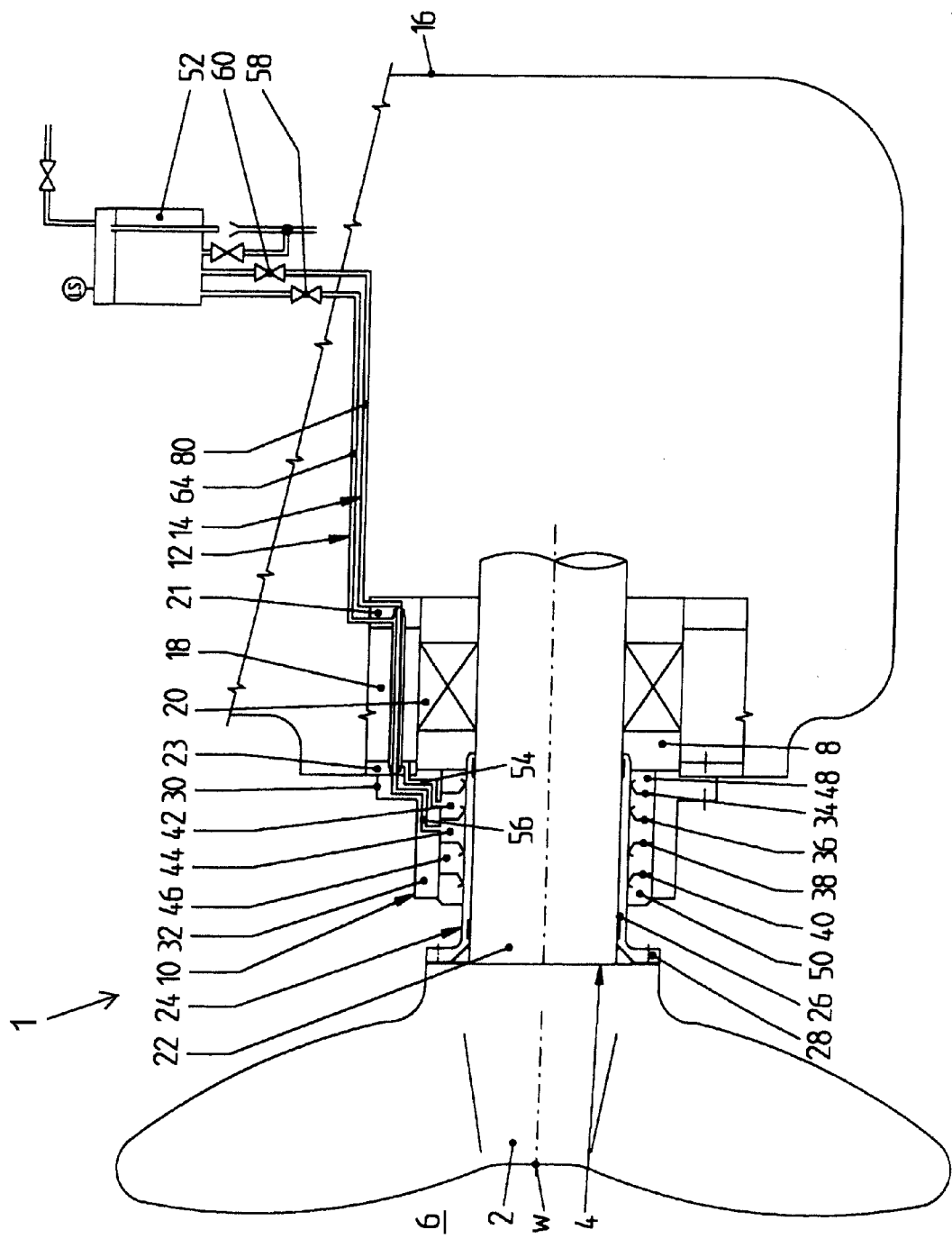
FIG. 1 is a simplified schematic sectional side view of an example embodiment of a seal apparatus according to the invention.

FIG. 1 shows a schematic longitudinal section of a preferred example embodiment of a seal apparatus 1 for providing a seal around a ship propeller shaft 4 that carries and drives a ship propeller 2. The propeller shaft 4 extends between the interior of a ship hull 16 and the exterior of the ship hull 16 into the exterior water 6 where the propeller 2 is arranged. The seal apparatus 1 comprises a multiple seal arrangement 10 around the propeller shaft 4 between the exterior water 6 and a lubricant space 8 around the shaft 2 inside the ship hull 16. The seal apparatus 1 further includes plural medium lines 12 and 14 for supplying and returning one or more seal fluids to and from the multiple seal arrangement 10. In the illustrated example embodiment, the propeller shaft 4 extends through a stern tube or a stern seal bush housing at the area where it penetrates through the ship hull 16. As mentioned above, the inventive seal apparatus can also be used in gondola or pod housings of pod drive systems, transverse thrusters, active thruster rudders, other types of thrusters, and the like.

More particularly, the propeller shaft 4 extends through a non-rotational massive housing 18 in the interior of the ship hull 16, particularly where the shaft 4 passes outwardly through the hull 16. The lubricant space 8 is radially outwardly bounded by the housing 18, and the propeller shaft 4 is rotatably radially supported in a bearing 20 arranged in the housing 18. The housing 18 is generally annularly cylindrically shaped, with a hollow cylindrical interior. Two ring adapters 21 and 23 are respectively screwed onto the two opposite end faces of the cylindrical housing 18. These ring adapters will be described in further detail below.

An exterior shaft portion 22 of the propeller shaft 4 extends on the exterior water side out of the housing 18 and out of the ship hull 16. A running bushing 24 is arranged on this exterior shaft portion 22. The running bushing 24 includes a cylindrical part 26 by which the bushing 24 is guided, arranged and/or securely mounted on the shaft portion 22, as well as an annular flange 28 onto which the ship propeller 2 is screwed.

The multiple seal arrangement 10 is arranged outside of the ship hull 16, and particularly connected to the outside of the housing 18. The multiple seal arrangement 10 comprises a seal casing 30, that includes an annular flange 30 by which the seal arrangement 10 is non-rotationally secured on the propeller-side or exterior ring adapter 23. The seal casing further includes a multi-part cylindrical section 32, by which it encircles the cylindrical part 26 of the running bushing 24, as can be seen in FIG. 1 or in further enlarged detail also in FIG. 2.

The multiple seal arrangement 10 further comprises a plurality of seal rings 34, 36, 38 and 40 arranged in the cylindrical section 32 of the casing, whereby a respective seal chamber 42, 44 and 46 is formed respectively between successive neighboring pairs of the seal rings. While a multiple seal arrangement in general may include any plural number of seal rings, the illustrated example embodiment includes four seal rings, of which the first or forward seal ring 34 and the second or middle forward seal ring 36 (as seen in the direction from the housing to the propeller 2) are oriented with their seal lips extending toward the lubricant space 8, while the third or middle aft or rear seal ring 38 and the fourth or aft or rear seal ring 40 are oriented with their seal lips extending toward the exterior water 6. Thus, the first seal ring 34 and the second seal ring 36 are oriented opposite the third seal ring 38 and the fourth seal ring 40, whereby the two middle seal rings 36 and 38 are located back-to-back directly neighboring one another.

The terms "aft", "rear", "forward" etc. as used above and throughout this application identify directions or locations relative to one another, and generally also (but not strictly limiting) with reference to the ship. For example, the aft seal ring does not have to be located or oriented toward the stern of the ship, but instead could actually be oriented toward the bow or athwartship e.g. in an embodiment for a thruster rather than a main propulsion propeller.

As seen in the direction extending from the housing 18 toward the propeller 2, a first or forward seal chamber 42 is bounded and formed between the forward seal ring 34 and the middle forward seal ring 36. A second or middle seal chamber 44 is bounded and formed between the two middle seal rings 36 and 38. A third or rear or aft seal chamber 46 is formed and bounded between the middle rear seal ring 38 and the rear or aft seal ring 40.

An inboard or interior annular space 48 is arranged forwardly from the forward seal chamber 42. This annular space 48 has its end face open to the lubricant space 8 and is separated by the forward seal ring 34 from the forward seal chamber 42. An outboard or exterior annular space 50 is arranged rearwardly behind the aft seal chamber 46. This annular space 50 has its end face open through an annular gap to the exterior water 6, and is separated from the aft seal chamber 46 by the aft seal ring 40.

The seal chambers 42, 44 and 46 each have a respective fluid provided therein, which respective fluid may be a liquid or a gas, for example exterior seawater, pressurized air, and/or oil. For example, the aft seal chamber 46 may have water therein, the middle seal chamber 44 may have pressurized air therein, and the forward seal chamber 42 may have oil therein. Alternatively, according to the present illustrated embodiment, the two seal chambers 42 and 44 are both provided with the same seal fluid from a tank 52. To supply the fluid, respective first and second medium supply lines or medium lines 12 and 14 are connected respectively to the seal chambers 42 and 44. Thus, in the illustrated embodiment, both medium supply lines 12 and 14, and particularly their respective pipe portions 64 and 80, are connected to a single common fluid supply tank 52, and both the forward seal chamber 42 and the middle seal chamber 44 are filled and flushed with the same common seal fluid circulated therethrough. For example, the fluid is a liquid and particularly an oil. Thus, the medium lines 12 and 14 in this embodiment are understood as liquid supply lines. Respective valves 58 and 60 are further provided in the medium lines 12 and 14 for opening and closing the respective flow passages through these supply lines.

Figure 2:
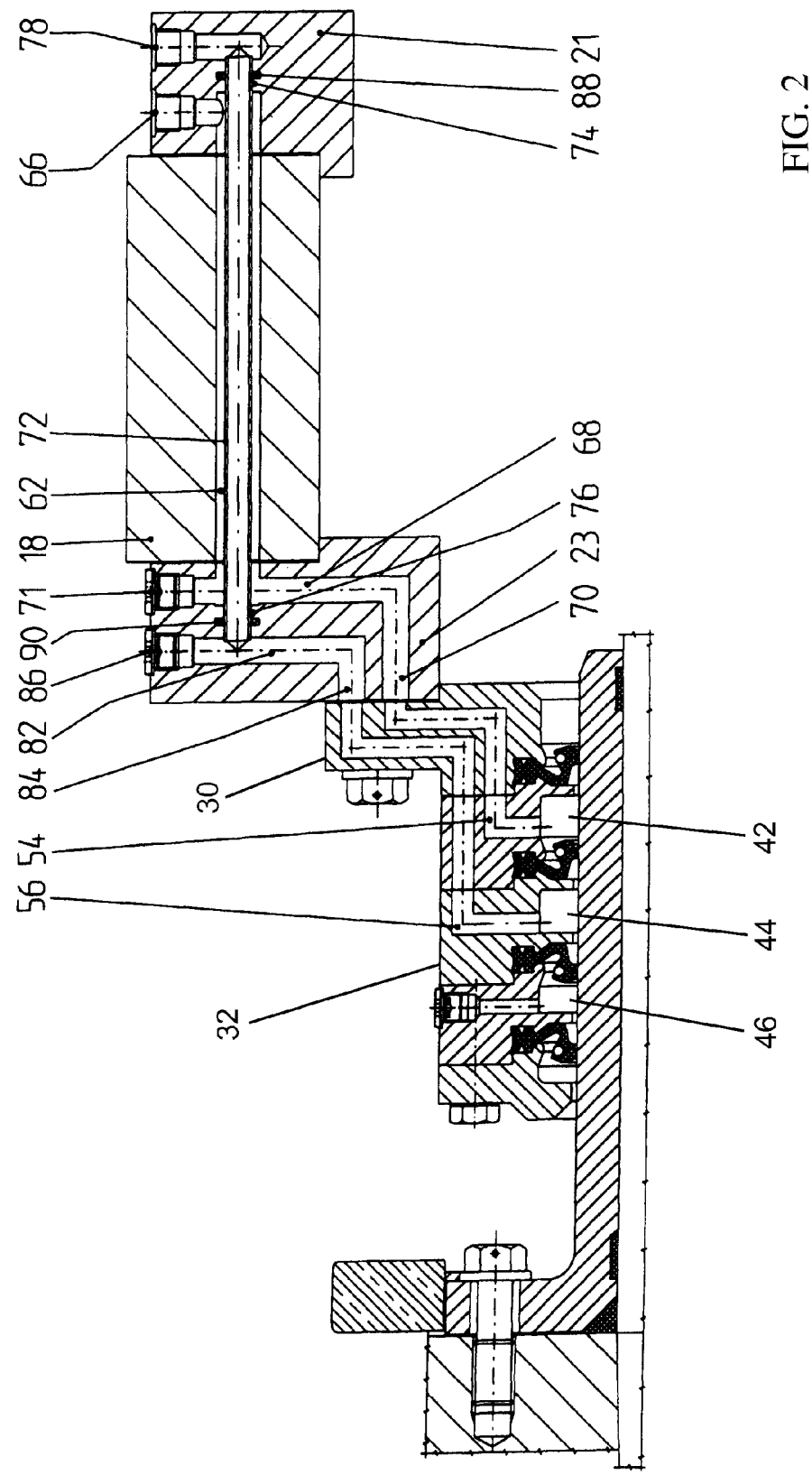
FIG. 2 is an enlarged schematic sectional view of a portion of the seal apparatus of FIG. 1.

Additionally, respective medium drain or return lines are also connected to the seal chambers 42 and 44 but are not shown, for example because they connect to a bottom circumferential portion of the chambers 42 and 44 and extend through a bottom circumferential portion of the multiple seal arrangement 10 and the housing 18, which is not shown in the detail view of FIG. 2. The fluid medium drain or return lines have also been omitted from FIG. 1 for simplicity. Alternatively, it should be understood that all or individual fluid medium supply lines 12 and 14 can be connected to a bottom circumferential area, while all or individual ones of the fluid medium drain or return lines can be connected to a top circumferential area of the multiple seal arrangement 10. It is thus not crucial in the drawings which side is considered the top or the bottom of the shaft and the seal arrangement. Basically, the respective fluid medium is supplied to the seal chamber 42 or 44 through the fluid medium supply line 12 or 14 from a tank 52, and this respective fluid medium is then drained from the respective seal chamber 42 or 44, treated as necessary (e.g. by filtering to remove dirt particles or other contaminants, or debubbling to remove gas bubbles), and then is returned back to the tank 52. In this manner, the respective fluid can be continuously circulated from the tank 52 to the seal chamber, and from the seal chamber back to the tank.

The supply side fluid medium lines 12 and 14 extend from the tank 52 through the housing 18 into the multiple seal arrangement 10.

Different portions of the length of each medium line 12 and 14 are embodied differently. For example, the portion 64 and 80 of each line 12 and 14 extending from the tank 52 to the housing 18 may comprise any suitable pipe, tube, hose, conduit, passage or combination thereof. Furthermore, where the medium lines 12 and 14 penetrate through the annular flange 30 and the cylindrical part 32 of the casing of the multiple seal arrangement 10, these portions of the medium lines 12 and 14 are embodied as respective angled hole or passage systems 54 and 56 as shown in detail in FIG. 2. For example, these angled passage systems 54 and 56 comprise bored holes or passages extending axially then radially through the annular flange 30, then axially and again radially through the cylindrical casing part 32, to communicate into the seal chambers 42 and 44.

Another portion of each fluid supply line 12 and 14 is formed through the housing 18 and the ring adapters 21 and 23 as basically shown in FIG. 1 and additionally shown in enlarged detail in FIG. 2. In this regard, an axial bored hole or passage 62 extends through the housing 18 parallel to the axis w of the propeller shaft 14, and is capped or closed at the end faces of the housing 18 by the ring adapters 21 and 23. Furthermore, a tube or pipe 72 is inserted in the axial passage 62, preferably coaxially therein in the illustrated embodiment, and respective opposite ends of the pipe 72 are received in pipe receiver holes 74 and 76 provided in the annular ring adapters 21 and 23. Additionally, the ring adapter 21 serves for the hull side connection of further elements that bound the lubricant space, and the ring adapter 23 serves for connection of the multiple seal arrangement 10 and particularly its annular flange 30 on the exterior water side.

The axial bored hole or passage 62 extends entirely axially through the housing 18 and penetrates into the two ring adapters 21 and 23 without penetrating through them. Thereby the axial passage 62 is capped or closed at its ends by the ring adapters 21 and 23. However, to provide a fluid connection from the axial passage 62 to the tank side pipe portion 64 of the medium line 12, a radial connection port 66 is bored into the tank side ring adapter 21 and communicates radially into an end of the axial passage 62. On the aft or exterior end, to provide a fluid connection of the axial passage 62 with the angled passage system 54 in the casing of the multiple seal arrangement 10, a radial passage 68 is bored into the exterior ring adapter 23 to extend from the axial passage 62 radially inwardly and communicate with a further axial passage 70 also bored into the ring adapter 23. This axial passage 70 in turn extends on one side out of the end face of the ring adapter 23 and is connected or communicated in a sealed manner with the angled passage system 54. The radial passage 68 is closed by a closure element, e.g. a plug 71, at its radially outer end. In this manner, the annular outer portion of the axial passage 62 outside of the inserted pipe 72 forms a portion of the fluid medium supply line 12 between the tank side pipe portion 64 and the angled passage system 54 in the casing of the seal arrangement 10 feeding into the seal chamber 42.

Furthermore, the pipe 72 arranged preferably coaxially within the axial passage 68 forms a portion of the fluid medium supply line 14 between the pipe portion 80 on the tank side and the angled passage system 56 extending through the casing of the seal arrangement 10 into the middle seal chamber 44. To achieve this, the detailed connections and arrangement of the pipe 72 will be described further below. To prevent that the entire flow cross-section of the axial passage 62 is taken up by the pipe 72, the pipe 72 has an outer diameter smaller than the inner diameter of the axial passage 62. Moreover, the respective diameters are appropriately chosen to properly balance the available flow cross-sections to achieve the required fluid flow rates with sufficiently low restriction. To ensure the required throughflow quantity or rate of the fluid medium through the axial passage 62 and through the inserted pipe 72 respectively, it may be necessary to enlarge the diameter of the axial passage 62 before inserting the pipe 72, for example in the case of retrofitting, supplementing or refurbishing an existing seal arrangement that already has an axial passage through a housing thereof. Such enlargement of the axial passage can be achieved by boring or reaming out the existing passage to a larger diameter, with much less time, effort and expense than boring a completely new additional passage.

To achieve the abovementioned arrangement and communication of the inserted pipe 72 as a section of the fluid medium supply line 14, the pipe 72 extends axially longer than and out of the axial passage 62, and is received in two respective pipe receiver holes 74 and 76 in the two ring adapters 21 and 23. In this manner, the pipe 72 can be arranged free of pipe supports such as spiders or the like within the entire length of the axial passage 62. Namely, the pipe 72 is supported only at its ends in the pipe receivers 74 and 76, and not within the axial passage 62. The pipe receivers 74 and 76 may be embodied as bored throughholes extending axially from the ends of the axial passage 62 in the ring adapters 21 and 23, and extending into further passages as follows. In the tank side ring adapter 21, the pipe receiver 74 communicates into a radial connection port 78 for connecting the pipe 72 with the pipe section 80 of the medium supply line 14 on the tank side. The pipe receiver 76 in the ring adapter 23 on the seal arrangement side communicates into a radial passage 82 in the ring adapter 23. The radial passage 82 in turn further communicates into an axial passage 84 extending axially out of the ring adapter 23 on an end face thereof, where it is connected or communicated in a sealed manner with the angled passage system 56 in the casing of the multiple seal arrangement 10. To close the radial passage 82 and prevent fluid leakage therefrom, the radially outer end thereof is closed by a closure element such as a plug 86.

Furthermore, to ensure a fluid tight seal of the pipe 72 and thereby prevent a fluid exchange between the medium line 12 and the medium line 14, where the pipe 72 passes through the pipe receivers 74 and 76, respective encircling ring seals 88 and 90 such as O-rings are received in annular grooves in the pipe receivers 74 and 76 in the ring adapters 21 and 23 to form liquid tight seals around the pipe 72.

The illustrations in FIGS. 1 and 2 show the medium lines 12 and 14, e.g. especially the passages 68, 70 and the passages 82, 84 in the aft ring adapter 23, all lying in the same axial sectional plane, i.e. on the same plane in the circumferential direction. However, as a preferred alternative, for reasons of simplified fabrication technique, the passages of the medium line 12 are offset in the circumferential direction from the passages of the medium line 14 in the ring adapter 23. Namely, the radial passage 68 and the axial passage 70 of the medium line 12 communicating with the forward seal chamber 42 preferably do not lie in the same sectional plane (as illustrated for simplicity) as the radial passage 82 and the axial passage 84 of the medium line 14 communicating with the middle seal chamber 44. Instead, the passages 68 and 82 may diverge away from one another at different radial positions about the axis of the pipe 72 and the axial passage 62. Thus, in such a configuration the passages 68 and 82 do not extend truly radial relative to the axis w of the shaft 4. As another alternative, the passages 68 and 82 are offset substantially parallel to one another. The only requirement is that the passage 82 communicates for fluid flow with the pipe 72, and the passage 68 communicates for fluid flow with the passage 62. For example, the passage 68 may graze tangentially along one side of the passage 62 rather than being centered and intersecting the axis of the passage 62. Similar considerations apply in the forward ring adapter 21, where the connection port 66 and the connection port 78 do not need to lie in the same section plane as one another.

Furthermore, the illustrated example embodiment includes only a single pipe 72 inserted coaxially in the axial passage 62 in the housing 18. In an alternative embodiment, a single pipe 72 is arranged not coaxially but rather offset within the passage 62. In further embodiments, plural pipes 72 are arranged in a respective single axial passage 62. In a first such alternative embodiment, the plural pipes 72 are arranged coaxially one within another and coaxially within the passage 62. In a second such alternative embodiment, the plural pipes 72 are arranged side-by-side in the passage 62, whereby the pipes may, for example, be bundled around the axis of the passage 62. In any event, the appropriate diameters are provided for the respective pipes and the passage, to ensure an adequate flow cross-section for each flow passage. Also, the passages, connection ports, and pipe receivers in the ring adapters 21 and 23 are supplemented or modified to accommodate, mount and communicate with the additional inserted pipes.

While the illustrated example embodiment shows the two medium lines 12 and 14 being supply lines for the two seal chambers 42 and 44, alternatively the two medium lines 12 and 14 can be a supply line and a return line for a single one of the seal chambers. In another alternative embodiment, another arrangement similar to the arrangement shown at the top of the apparatus for the supply lines 12 and 14, is also provided at the bottom of the apparatus for corresponding return lines. In the illustrated embodiment, both of the medium lines 12 and 14 supply the same fluid medium, namely oil as a liquid seal medium, but alternatively the two lines may supply different fluid media such as a liquid medium like oil and a gaseous medium like pressurized air.

The invention further relates to a method of fabricating a seal apparatus as disclosed herein, whereby the method is especially suitable for a technically simple and quick retrofitting or supplementing of an existing seal arrangement to a multiple seal arrangement 10 having an increased number of seal stages in a previously existing seal apparatus for sealing a ship propeller shaft. Thus, it is necessary to provide at least one additional fluid medium line to serve the at least one additional seal chamber of the additional seal stage. Alternatively, the retrofitting involves adding an active fluid medium supply to a previously existing seal chamber that was previously not actively supplied with a flow of fluid medium. In such a situation, the number of seal stages and seal chambers is not increased, but it is nonetheless necessary to provide at least one additional medium line penetrating through the housing 18. In such retrofit situations, the invention calls for inserting a pipe 72 as a section of the additional medium line 14 into an existing axial passage 62 extending through the housing 18 as a section of an existing medium line 12. The inserted pipe 72 thus forms a convenient, simple and effective bridging of the additional medium line over a large axial distance through the housing 18 between the two ring adapters 21 and 23, without requiring the formation (e.g. boring) of an additional axial passage through the large axial thickness of the housing 18. Only the ring adapters 21 and 23 must be specially adapted according to the invention as disclosed herein for accommodating, holding and communicating with the additional inserted pipe 72. If necessary to ensure an adequate flow cross-section, the existing axial passage 62 may be bored or reamed out to an enlarged diameter before inserting the pipe 72.

Although the invention has been described with reference to specific example embodiments, it will be appreciated that it is intended to cover all modifications and equivalents within the scope of the appended claims. It should also be understood that the present disclosure includes all possible combinations of any individual features recited in any of the appended claims. The abstract of the disclosure does not define or limit the claimed invention, but rather merely abstracts certain features disclosed in the application.

What is claimed is:

1. A seal apparatus for sealing around a rotating shaft of a watercraft where said shaft penetrates from an interior side to an exterior side of a hull of said watercraft, comprising:
   a housing around said shaft;
   plural seal rings around said shaft, forming at least one seal chamber axially between successive ones of said seal rings; and
   plural medium lines communicating with said at least one seal chamber, and including at least one medium supply line to supply a respective fluid medium to said at least one seal chamber and at least one medium return line to remove said respective fluid medium from said at least one seal chamber;
   wherein a first portion of a first one of said medium lines is arranged and extends longitudinally within a first portion of a second one of said medium lines,
   wherein said first portion of said second medium line comprises a passage extending through said housing,
   wherein said first portion of said first medium line comprises a pipe arranged and extending within said passage, and
   wherein said pipe has an outer diameter smaller than an inner diameter of said passage.

2. The seal apparatus according to claim 1, wherein said pipe is arranged centered coaxially within said passage.

3. The seal apparatus according to claim 1, wherein there are no support structures supporting said pipe within and relative to said passage.

4. The seal apparatus according to claim 1, wherein said housing comprises an annular housing around said shaft.

5. The seal apparatus according to claim 1, wherein said passage is a bored hole extending axially parallel to an axis of said shaft.

6. The seal apparatus according to claim 1,
further comprising a forward adapter ring connected to a forward end of said housing,
wherein said forward adapter ring has therein a first connection port communicating with said pipe, a second connection port communicating with said passage in said housing, a dividing wall between said first and second connection ports, and a pipe receiver hole through said dividing wall,
wherein an end of said pipe is received and sealed in said pipe receiver hole so that said pipe communicates with said first connection port and does not communicate with said second connection port, and so that said pipe is structurally supported in said pipe receiver hole, and
wherein said first connection port forms a second portion of said first medium line, and said second connection port forms a second portion of said second medium line.

7. The seal apparatus according to claim 1,
further comprising an aft adapter ring connected to an aft end of said housing,
wherein said aft adapter ring has therein a first adapter passage communicating with said pipe, a second adapter passage communicating with said passage in said housing, a dividing wall between said first and second adapter passages, and a pipe receiver hole through said dividing wall,
wherein an end of said pipe is received and sealed in said pipe receiver hole so that said pipe communicates with said first adapter passage and does not communicate with said second adapter passage, and so that said pipe is structurally supported in said pipe receiver hole, and
wherein said first adapter passage forms a second portion of said first medium line, and said second adapter passage forms a second portion of said second medium line.

8. The seal apparatus according to claim 7, wherein said first adapter passage and said second adapter passage are coplanar with one another lying on a common plane extending along an axis of said shaft.

9. The seal apparatus according to claim 7, wherein said first adapter passage and said second adapter passage are not coplanar with one another and respectively extend along two distinct planes.

10. The seal apparatus according to claim 7, further comprising an annular seal casing in which said seal rings are arranged, wherein said seal casing is connected to said aft adapter ring, said seal casing has therein a first casing passage communicating with said first adapter passage and a second casing passage communicating with said second adapter passage, and said first and second casing passages form third portions of said first and second medium lines respectively and communicate with said at least one seal chamber.

11. The seal apparatus according to claim 1, wherein said first medium line is a first said medium supply line communicating with a first said seal chamber, and said second medium line is a second said medium supply line communicating with a second said seal chamber.

12. The seal apparatus according to claim 1, wherein said first medium line is a first said medium supply line communicating with a first said seal chamber, and said second medium line is a first said medium return line communicating with said first seal chamber.

13. The seal apparatus according to claim 1, wherein said first and second medium lines are both gas lines conveying a gaseous medium or are both liquid lines conveying a liquid medium.

14. The seal apparatus according to claim 1, wherein said first medium line is a liquid line conveying a liquid medium and said second medium line is a gas line conveying a gaseous medium.

15. The seal apparatus according to claim 1, wherein said first medium line is a gas line conveying a gaseous medium and said second medium line is a liquid line conveying a liquid medium.

16. The seal apparatus according to claim 1, wherein a first portion of a third one of said medium lines is arranged and extends longitudinally within said pipe.

17. The seal apparatus according to claim 1, wherein a first portion of a third one of said medium lines is arranged and extends longitudinally within said passage of said first portion of said second medium line outside of and alongside said pipe.

18. A method for retrofitting or supplementing a seal apparatus for sealing around a rotating shaft of a watercraft where said shaft penetrates from an interior side to an exterior side of a hull of said watercraft, said seal apparatus having plural seal rings around said shaft, forming at least one seal chamber axially between successive ones of said seal rings, and having a housing around said shaft with a housing passage extending through said housing, wherein said method comprises the steps:
inserting a pipe into said housing passage so that said pipe extends longitudinally within said housing passage through said housing, wherein said pipe has an outer diameter smaller than an inner diameter of said housing passage, and
respectively communicating said pipe and said housing passage outside of said pipe with said at least one seal chamber to respectively supply or remove a respective fluid medium to or from said at least one seal chamber through said pipe and through said housing passage outside of said pipe.

19. The method according to claim 18, further comprising a step of enlarging said inner diameter of said housing passage before said step of inserting said pipe.

20. The method according to claim 18, wherein said communicating step comprises connecting an adapter ring to said housing, wherein said adapter ring has a first adapter passage that communicates with said pipe but does not communicate with said housing passage, and wherein said adapter ring has a second adapter passage that communicates with said housing passage but does not communicate with said pipe.

* * * * *